United States Patent [19]
Proffit et al.

[11] Patent Number: 5,084,983
[45] Date of Patent: Feb. 4, 1992

[54] PRINTING PRESS PACKING GAUGE SUPPORT

[76] Inventors: John D. Proffit, 1436 River Rd.; Jerry D. Morrison, 114C Kraft Street, both of Clarksville, Tenn. 37040

[21] Appl. No.: 552,564

[22] Filed: Jul. 16, 1990

[51] Int. Cl.⁵ .......................... G01B 3/22; G01B 5/06
[52] U.S. Cl. ........................................ 33/834; 33/572; 33/551
[58] Field of Search ................. 33/614, 617, 618, 621, 33/626, 833, 834, 832, 551, 553, 572

[56] References Cited

U.S. PATENT DOCUMENTS

| | | | |
|---|---|---|---|
| 2,840,918 | 7/1958 | Wildeman | 33/834 |
| 3,090,129 | 5/1963 | Gifford | |
| 3,324,759 | 6/1967 | Fielding | 33/618 |
| 3,432,933 | 3/1969 | Wood | 33/834 |
| 4,450,628 | 5/1984 | Rocks | 33/833 |

FOREIGN PATENT DOCUMENTS

| | | | |
|---|---|---|---|
| 3435860 | 1/1986 | Fed. Rep. of Germany | 33/832 |
| 219053 | 5/1941 | Switzerland | 33/614 |

*Primary Examiner*—Thomas B. Will
*Attorney, Agent, or Firm*—Fleit, Jacobson, Cohn, Price, Holman & Stern

[57] ABSTRACT

An elongated gauge support body plate is provided including opposite side longitudinal margins equipped with opposite end abutment blocks projecting outwardly from one side of the plate for seated engagement with a partial cylindrical surface. The plate defines a center longitudinal plane for containing the center axis of a cylindrical surface with which the abutment blocks are abuttingly engaged and along which probe-type indicators may be supported to indicate blanket cylinder height in relation to blanket cylinder end bearer height when the plate is supported adjacent one end of a press blanket cylinder.

12 Claims, 2 Drawing Sheets

PRINTING PRESS PACKING GAUGE SUPPORT

BACKGROUND OF THE INVENTION

1. Field of the Invention

This invention relates to an apparatus for accurately determining the "squeeze" between the plate and blanket of plate and blanket cylinders, respectively, of a printing press and therefore the thickness of the packing required beneath the plate on the plate cylinder and beneath the blanket on the blanket cylinder in order to maintain high quality printing.

2. Description of Related Art

Various different forms of blanket thickness gauges and other devices have been provided to determine and help maintain proper "squeeze" on a printing press between the plate and the blanket in order to ensure top quality printing. Examples of these previously known gauges and other devices are disclosed in U.S. Pat. Nos. 2,840,918, 3,090,129, 3,432,933 and 4,450,268. However, these previously known devices are not as readily usable and accurate as the packing gauge of the instant invention.

SUMMARY OF THE INVENTION

When a plate is to be mounted upon the plate cylinder of a printing press the pressman determines the thickness of the plate in relation to the amount of undercut of the plate cylinder relative to the bearer diameter and thereafter determines the thickness of packing paper which must be disposed on the plate cylinder beneath the plate. Likewise, when a blanket is installed on the blanket cylinder the thickness of the blanket is determined relative to the undercut of the blanket cylinder and a predetermined thickness of packing paper is disposed beneath the blanket on the blanket cylinder. After the plate and blanket have been mounted on the plate and blanket cylinder it is desired that the "squeeze" between the blanket and the plate will be between 0.0508 mm and 0.0762 mm inch.

With the plate and blanket thus mounted on the plate and blanket cylinders, printing accomplished by the associated press should be sharp, clean and with ink at full density.

However, after one or two thousand sheets have been run on a press, the "squeeze" between the plate and the blanket tends to decrease and results in a lack of ink transferring to the blanket from the plate. The reduction in "squeeze" is due to the packing beneath the plate and/or the blanket being repeatedly compressed and experiencing a reduction in effective thickness.

Then, in order to restore the "squeeze" to between 0.0508 mm and 0.0762 mm inch, the blanket is removed and the necessary thickness additional packing is added to the blanket cylinder before the blanket is reinstalled on the cylinder.

While various gauges heretofore have been provided for determining blanket thickness and the height of the outer surface of the blanket relative to the height of the outer surfaces of the bearers at the ends of a blanket cylinder, most of these previously known gauges are either not reliable or difficult to properly use.

Accordingly, the main object of this invention is to provide a gauge which may be used to determine the effective thickness of the blanket and packing on a blanket roll by measuring the difference between height of the bearers of a blanket cylinder in relation to the height of the outer surface of the blanket.

Yet another object of this invention is to provide a gauge in accordance with the preceding object and which also may be used along the axial length of a blanket in order to locate thin areas of the backing for the blanket.

Another important object of this invention is to provide a gauge which may be used to accurately determine the "squeeze" between the plate and blanket of a press, even by inexperienced persons.

A further object of this invention is to provide a gauge in accordance with the preceding objects and which may be adjusted according to different diameter plate and blanket cylinders.

A final object of this invention to be specifically enumerated herein is to provide a gauge in accordance with the preceding objects and which will conform to conventional forms of manufacture, be of simple construction and easy to use so as to provide a device that will be economically feasible, long-lasting, and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
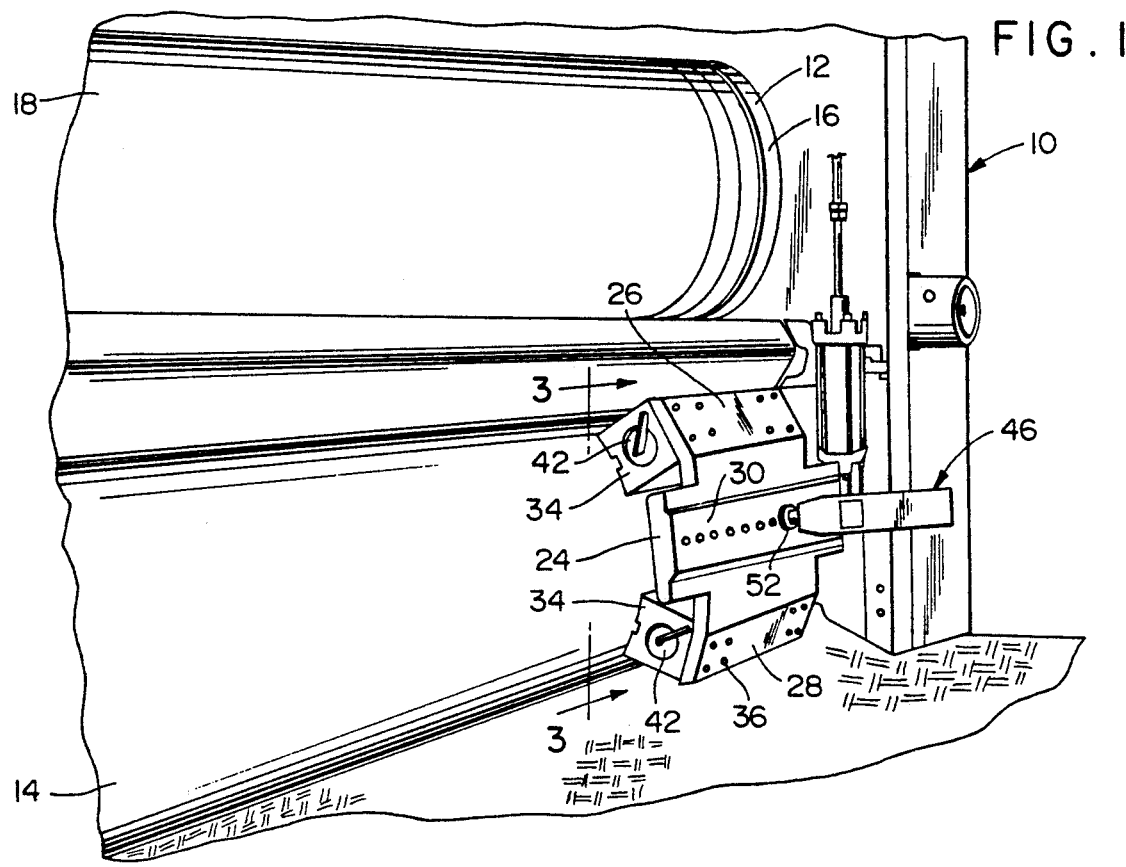
FIG. 1 is a fragmentary perspective view of a typical printing press including undercut upper and lower plate and blanket cylinder and illustrating a first form of gauge constructed in accordance with the present invention operatively associated with the blanket and right hand bearer of the blanket cylinder.
Figure 2:
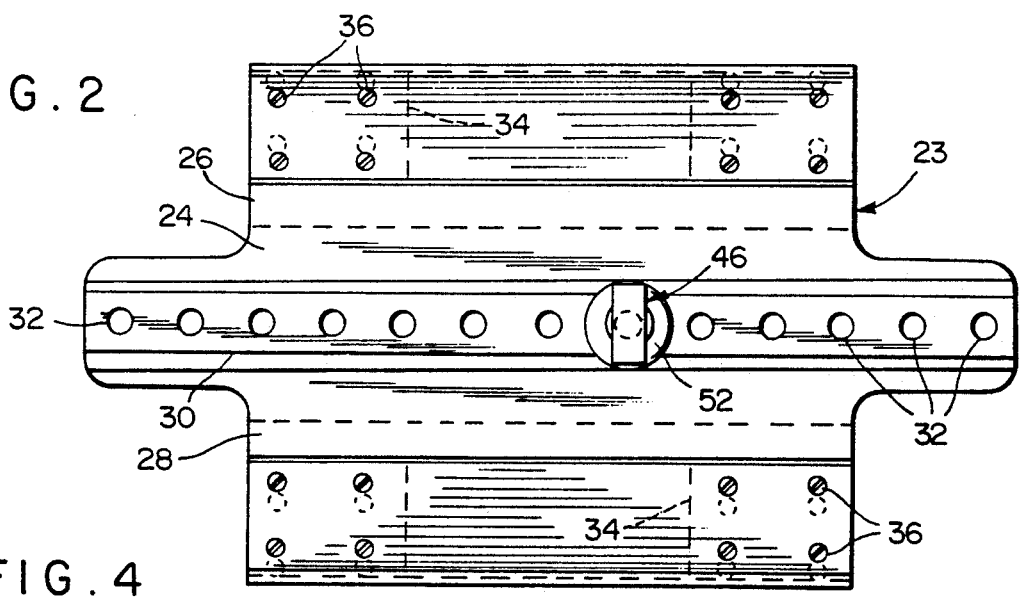
FIG. 2 is an enlarged top plan view of the first form of the gauge.
Figure 4:
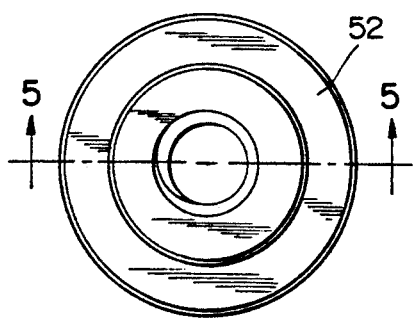
FIG. 4 is an enlarged top plan view of an abutment member mounted on the indicator utilized with the gauge.
Figure 5:
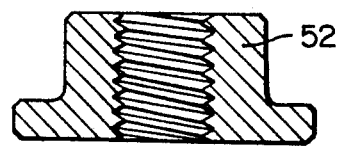
FIG. 5 is a vertical sectional view taken substantially upon a plane indicated by the section line 5—5 of FIG. 4.

Referring now more specifically to the drawings the numeral 10 generally designates a typical press including a plate cylinder 12 opposing a blanket cylinder 14. The cylinders 12 and 14 include opposite end bearers 16 and the plate cylinder 12 has a plate 18 mounted thereon while the blanket cylinder 14 has a blanket 20 mounted thereon. The blanket 20 is mounted upon the undercut central portion of the blanket cylinder 14 over a packing 22 which may be in the order of 0.0254 mm inch in thickness. The plate 18 is similarly mounted on the cylinder 12.

The gauge of the instant invention is designated by the reference numeral 23 and includes an elongated base plate 24 having integral opposite longitudinal side margins or wings 26 and 28 slightly angled relative to the base plate 24. Each of the wings 26 and 28 is elongated and extends longitudinally of the corresponding side margin of the base plate 24. The base plate 24 includes an outer planar surface 30 and is equipped with a plurality of longitudinally spaced bores 32 therethrough spaced evenly along the longitudinal center of the base plate 24.

The opposite ends of each wing 26 and 28 include abutment blocks 34 supported therefrom through the utilization of removable fasteners 36 and the blocks 34 are outwardly convergent from the inner planar surface 37 of the base plate 24 with the outer ends of the abutment blocks 34 including co-extensive partial cylindrical abutment surfaces 38 of a radius of curvature at least substantially coinciding with the radius of curvature of the outer surface 40 of the blanket 20, the abutment surfaces 38 of the blocks 34 being selected for a given size blanket cylinder.

The abutment blocks 34 include magnet assemblies oscillatably supported therefrom for shifting between "on" and "off" positions and may be used to magnetically support the gauge 23 from the blanket cylinder 14, even when the packing 22 and blanket 20 are disposed between abutment blocks 34 and the cylinder 14.

Figure 3:
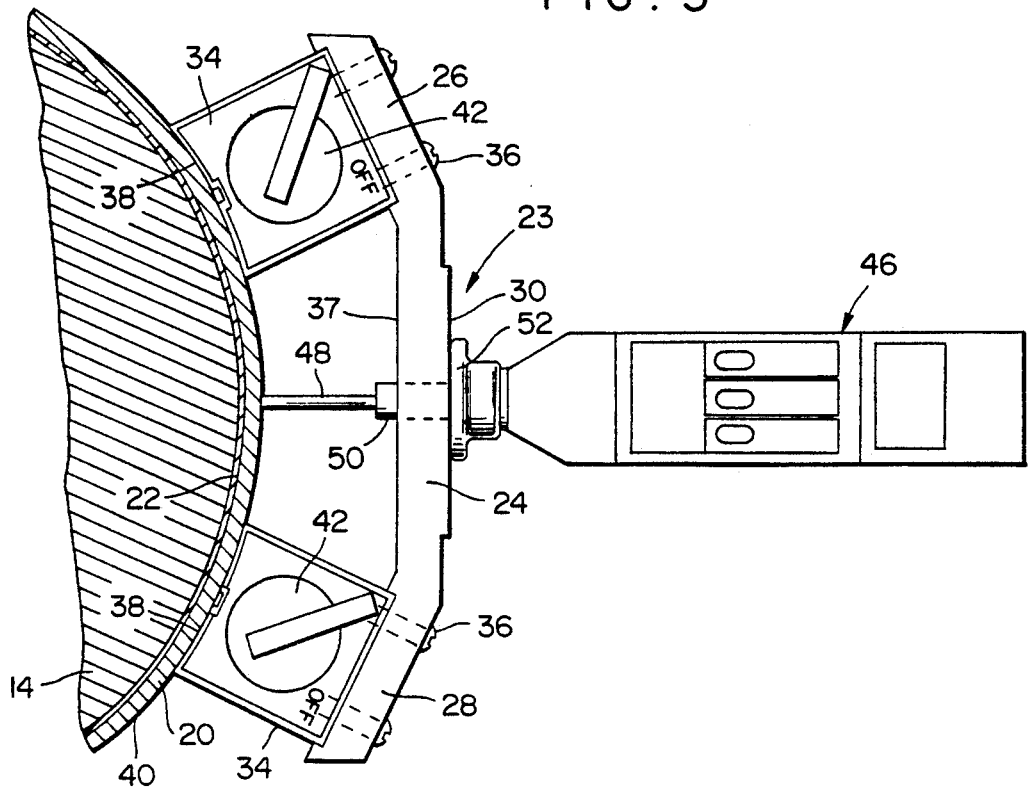
FIG. 3 is an enlarged fragmentary sectional view taken substantially upon a plane indicated by the section line 3—3 of FIG. 1.

The abutment blocks 34 are spaced apart along the wings 26 and 28 in order to ensure that the plane containing the longitudinal center lines of the bores 32 will pass through the center axis (not shown) of the blanket cylinder 14 when the gauge 23 is mounted on the blanket cylinder 14 in the manner illustrated in FIG. 3. By spacing the abutment surfaces 38 considerable distances apart along the wings 26 and 28 slight oscillatory shifting of the gauge 23 as it is first engaged with the outer surface 40 of the blanket 20 will ensure proper seating of the abutment surfaces 38 against the outer surface 40 before the magnet assemblies 42 are shifted to the "on" positions thereof illustrated in FIG. 3.

A hand held electronic indicator is referred to in general by the reference numeral 46 and includes a reciprocal probe 48 slidable through a guide sleeve 50 projecting outward from an abutment member 52. The guide sleeve is snugly slidably receivable through each of the bores 32 to a position with the abutment member 52 abutted against the outer surface 30 of the plate 24. The outer surface 30 and abutment surface 38 must be kept clean.

Initially, the gauge 23 is placed against and magnetically attracted to the cylinder 14 adjacent one of the bearers 16 thereof with one end of the base plate 24 projecting over the bearer 16. Then, the indicator may be positioned with the guide sleeve 50 thereof projecting through one of the bores 32 in the end of the plate 24 overlying the bearer 16 of the cylinder 14 and with the probe engaged with the outer surface 40 and the abutment member 52 abutted against the outer surface 30. The reading of the indicator 46 may then be noted and the indicator 46 may be withdrawn from that bore 32 and thereafter placed through successive bores spaced longitudinally along the blanket 20 in order to read the height of the outer surface 40. If the blanket 20 is properly mounted and the packing 22 is of constant thickness, all readings by the indicator 46 along the length of the outer surface 40 should be substantially identical. After the height of the outer surface 40 adjacent one end of the blanket cylinder 14 has been checked, the gauge 23 may be successively positioned along the length of the blanket 20 so that the indicator may read the outer surface 40 along the full length of the blanket 20. Of course, after comparing the height of the outer surface 40 with the bearers 16 of the cylinder 14, the "squeeze" may be determined and, if necessary, the packing 22 may be added to in order to increase the effective thickness thereof. Also, certain areas of the packing 22 might be thinner than other areas (after a considerable run of the press 10) and appropriate additional thicknesses of packing 22 may be added to those thinner areas of the packing 22.

The gauge 23, in combination with the indicator 46, enables the consistency of the height of the outer surface 40 of the blanket 20 to be checked along the full length and circumference of the blanket 20 and the readings obtained from the blanket 20 may be compared in relation to the readings obtained at the bearers 16.

Figure 7:
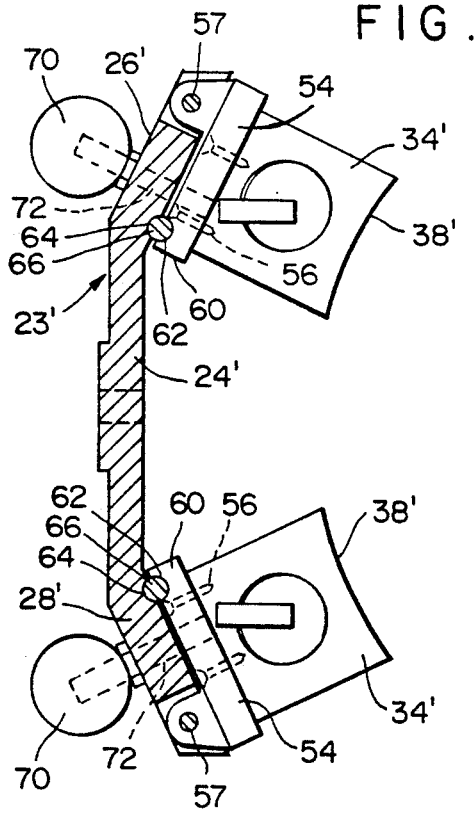
FIG. 7 is an enlarged sectional view taken substantially upon a plane indicated by the section line 7—7 of FIG. 6.
Figure 6:
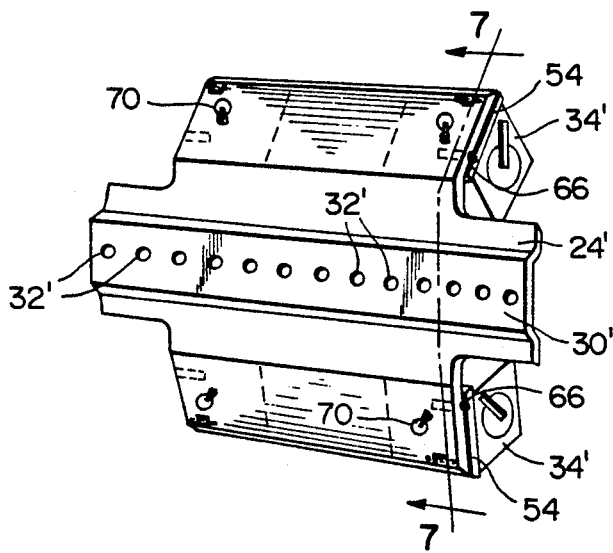
FIG. 6 is a perspective view of a second form of gauge constructed in accordance with the present invention.

With reference now more specifically to FIG. 7, a modified form of gauge is referred to in general by the reference number 23' and is identical in all respects to the gauge 23, except that the abutment blocks 34' thereof are mounted upon hinges 54 through the utilization of fasteners 56. The hinges 54 are pivotally supported as at 57 from the wings 26' and 28' of the plate 24' corresponding to the plate 24 and the outer surfaces 38' of the abutment blocks 34' are also partial cylindrical.

The hinges 54 include free swinging edge portions 60 provided with partial cylindrical recesses 62 and opposing portions of the wings 26' and 28' include opposing partial cylindrical recesses 64. A spacer pin 66 is interposed between each pair of corresponding partial cylindrical recesses 62 and 64 and each hinge 54 includes a thumb screw 70 threadedly engaged therewith and passing through a bore 72 provided therefore in the corresponding wing of the base plate 24'. The radius of curvature of the surfaces 38' are co-extensive in only one set of adjusted positions of the abutment blocks 34'. When the gauge 23' is to be used in conjunction with a smaller diameter cylinder, smaller diameter pins 66 are used and when the gauge 23' is to be used in conjunction with a larger diameter cylinder, larger diameter pins 66 are used. Of course, the thumb screws 70 are used to tighten the hinges 54 against the pins 66.

The use of the hinges 54 and pins 66 enable the gauge 23' to be modified for use in conjunction with different diameter cylinders. However, the operation of the gauge 23' is substantially identical to the operation of the gauge 23 once the gauge 23' has been mounted upon an associated press cylinder.

It is pointed out that once the bores 32 in the opposite ends of the plate 24 have been used to support the indicator 46 over the bearers at opposite ends of the cylinder 14 and the height of the outer surface 40 adjacent the bearers 16 has been compared to the height of the bearers 16, either gauge 23 or 23' may be repeatedly positioned across the length of the blanket 20 and the indicator 46 may be selectively positioned in each bore 32 in order to obtain further indications for use in comparison with the indications obtained at the bearers 16. Thus, the gauges 23 and 23' may be used to check the thickness of the packing 22 fully along the length of the cylinder 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A printing press packing gauge support for determining bearer surface height in relation to blanket surface height and to thereby check the "squeeze" between the plate of a plate cylinder and the blanket of a blanket cylinder, said gauge including an elongated base plate having opposite side longitudinal margins and opposite ends as well as inner and outer sides, said base plate including a row of a plurality of bores formed therethrough opening through said inner and outer sides and whose center lines are contained in the same plane, said longitudinal margins including opposite end pairs of abutment blocks supported therefrom at points spaced apart longitudinally along said margins and projecting inwardly of said inner side, said abutment blocks including outer surface portions disposed on a partial cylindrical path of predetermined radius of curvature for simultaneous seating engagement with a similar partial cylindrical area of the same radius of curvature, said row of bores including at least one end thereof projecting appreciably outwardly past the corresponding pair of abutment blocks, whereby said corresponding pair of abutment blocks may be engaged with circumferentially spaced blanket end portions and at least one bore at said one end of said row will be disposed over the corresponding blanket cylinder end bearer, said bores including outer ends opening through abutment portions of said outer side adapted to be engaged by an abutment member of a probe equipped indicator and disposed identical radial plane distances outward from the center axis of a cylindrical surface with which said outer surface portions are abutted.

2. The gauge of claim 1 wherein said outer surface portions of said abutment blocks comprise co-extensive concave partial cylindrical surface portions.

3. The gauge of claim 1 wherein said abutment blocks include magnet assemblies for magnetic attraction of said abutment blocks toward a closely adjacent ferrous body.

4. The gauge of claim 3 wherein said magnet assemblies include means operative to adjustably vary the magnetic attraction thereof.

5. The gauge of claim 1 wherein said abutment blocks are mounted from said longitudinal margins for angular adjustment relative thereto about axes paralleling said plane.

6. The gauge of claim 5 wherein said outer surface portions of said abutment blocks comprise co-extensive concave partial cylindrical surface portions.

7. The gauge of claim 5 wherein said abutment blocks include magnet assemblies for magnetic attraction of said abutment blocks toward a closely adjacent ferrous body.

8. The gauge of claim 7 wherein said magnet assemblies include means operative to adjustably vary the magnetic attraction thereof.

9. A printing press packing gauge support for determining bearer surface height in relation to blanket surface height and to thereby check the "squeeze" between the plate of a plate cylinder and the blanket of a blanket cylinder, said gauge including an elongated base plate having opposite side longitudinal margins and opposite ends as well as inner and outer sides, said longitudinal margins including opposite end pairs of abutment blocks supported therefrom at points spaced apart longitudinally along said margins projecting inwardly of said inner side, said abutment blocks including outer surface portions disposed on a partial cylindrical path of predetermined radius of curvature for simultaneous seating engagement with a similar partial cylindrical area of the same radius of curvature, said base plate including means defining indicator mounting locations spaced longitudinally therealong and between said pairs of abutment blocks operative to support probe-type indicators therefrom along a path disposed in a radial plane of the center axis of said partial cylindrical path disposed intermediate said opposite side margin supported abutment blocks and for engagement of said indicators with said blanket surface along said plane and between said pairs of abutment blocks.

10. The gauge support of claim 9 wherein said outer surface portions of said abutment blocks comprise co-extensive concave partial cylindrical surface portions.

11. The gauge support of claim 9 wherein said abutment blocks include magnet assemblies for magnetic attraction of said abutment blocks toward a closely adjacent ferrous body.

12. The gauge support of claim 9 wherein said radial plane is disposed centrally intermediate said longitudinal margin supported abutment blocks.

* * * * *